United States Patent [19]

Bellina

[11] B 3,923,786

[45] Dec. 2, 1975

[54] 1-HETEROCYCLIC CARBAMOYL-N-CARBAMOYLOXY FORMIMIDATES

[75] Inventor: Russell F. Bellina, Wilmington, Del.

[73] Assignee: E. I. Du Pont de Nemours and Company, Wilmington, Del.

[22] Filed: June 13, 1973

[21] Appl. No.: 369,607

[44] Published under the Trial Voluntary Protest Program on January 28, 1975 as document no. B 369,607.

Related U.S. Application Data

[62] Division of Ser. No. 55,290, July 15, 1970, Pat. No. 3,755,403.

[52] U.S. Cl... 260/239 BF; 260/239 B; 260/293.65; 260/293.67; 260/293.85; 260/293.86; 260/326.36; 260/326.42; 260/326.5 S; 260/326.5 D; 260/326.5 E

[51] Int. Cl.² .................................... C07D 295/18

[58] Field of Search ..... 260/239 B, 239 BF, 293.67, 260/293.86, 293.65, 293.85, 326.36, 326.42, 326.5 S, 326.5 D, 326.5 E; 55/290

[56] References Cited

UNITED STATES PATENTS

| 3,530,220 | 9/1970 | Buchanan | 424/320 |
| 3,557,190 | 1/1971 | Buchanan | 260/453 R |
| 3,576,834 | 4/1971 | Buchanan | 260/453 R |
| 3,694,431 | 9/1972 | Fuchs et al. | 260/293.86 |

FOREIGN PATENTS OR APPLICATIONS

| 1,101,785 | 1/1968 | United Kingdom | 260/453 R |
| 1,467,548 | 12/1966 | France | 260/453 R |

OTHER PUBLICATIONS

C.A. 71 : 70150 P (1969) Breck–Buehler et al.

Primary Examiner—Henry R. Jiles
Assistant Examiner—S. D. Winters

[57] ABSTRACT

A class of 1-carbamoyl-N-carbamoyloxy formimidates, such as methyl 1-(pyrrolidinocarbonyl)-N-(methylcarbamoyloxy)-formimidate, useful in preventing the destructive effects of pests such as insects, ticks, mites and nematodes.

3 Claims, No Drawings

1

1-HETEROCYCLIC CARBAMOYL -N- CARBAMOYLOXY FORMIMIDATES

CROSS-REFERENCE TO RELATED APPLICATION

This application is a division of my application Ser. No. 55,290, filed July 15, 1970, now U.S. Pat. No. 3,755,403. The entire disclosure of application Ser. No. 55,290 is hereby incorporated by reference.

BACKGROUND OF THE INVENTION

This invention relates to chemical pesticides and is more particularly directed to a class of novel 1-carbamoyl-N-carbamoyloxy formimidates, and their use as pesticides.

British Pat. No. 1,181,023 discloses a class of pesticidal 1-carbamoyl-N-(substituted carbamoyloxy)thioformimidates, such as methyl 1-carbamoyl-N-(methylcarbamoyloxy)-thioformimidate, and their use as pesticides. These thioformimidates are prepared by carbamylating an intermediate 1-carbamoyl-N-hydroxythioformimidate. The intermediate 1-carbamoyl-N-hydroxythioformimidate is prepared by reacting a 1-carbamoylformhydroxamyl chloride with a mercaptan in the presence of a base, or by reacting a methoxycarbonylformhydroxamyl chloride with a mercaptan in the presence of a base to form a 1-methoxycarbonyl-N-hydroxythioformimidate and then reacting the product with an appropriate amine.

The 1-carbamoyl-N-carbamoyloxy formimidates of this invention are made in a similar manner by carbamylating an intermediate 1-carbamoyl-N-hydroxyformimidate. However, the 1-carbamoyl-N-carbamoyloxy formimidates have never before been available, because there has not been available a method of making the necessary 1-carbamoyl-N-hydroxyformimidate intermediates. The procedures disclosed in the British patent for making 1-carbamoyl-N-hydroxythioformimidates are not applicable to the preparation of 1-carbamoyl-N-hydroxyformimidates. The alcohols are not as reactive as the mercaptans, and do not react directly with a formhydroxamyl chloride, as the mercaptans do. This is apparent from the fact that methanol was used as solvent in Example 1 of the British patent.

This invention is based in part on the discovery of a way to make the 1-carbamoyl-N-hydroxyformimidates which are necessary intermediates for making the pesticidal 1-carbamoyl-N-carbamoyloxy formimidates. It has been discovered that the necessary intermediates can be obtained by reacting a 1-carbamoylformhydroxamyl chloride with two equivalents of base, at least the second of which is an alkoxide. The first equivalent of base generates a 1-(carbamoyl)nitrile oxide, which will react with the equivalent of alkoxide to form the intermediate 1-carbamoyl-N-hydroxyformimidate. This intermediate can then be converted to pesticidal 1-carbamoyl-N-carbamoyloxy formimidates using conventional reactions.

The invention is also based on the discovery that the 1-carbamoyl-N-carbamoyloxy formimidates exhibit good pesticidal activity, combined with a good margin of safety for host plants and mammals.

The invention therefore makes available for the first time a novel class of compounds which are effective tools in preventing the serious economic loss caused each year by pests.

SUMMARY OF THE INVENTION

This invention is a class of novel 1-carbamoyl-N-carbamoyloxy formimidates of the formula:

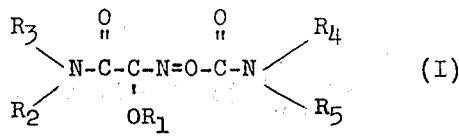

where:
R₁ is glycidyl; alkyl of 1 through 4 carbon atoms; alkenyl of 3 through 4 carbon atoms; alkynyl of 3 through 4 carbon atoms; cycloalkyl of 3 through 6 carbon atoms; or alkyl of 1 through 4 carbon atoms substituted with 1 through 3 halogen atoms or with a methoxy, ethoxy, nitro, cyano, hydroxy, methylthio, carboxy, carbomethoxy, carboethoxy, amino, methylamino, ethylamino, dimethylamino, methylethylamino, methylpropylamino, or diethylamino group;

R₂ and R₃ are taken together and are alkylene of 4 through 6 carbon atoms;

R₄ is hydrogen, alkyl of 1 through 3 carbon atoms, allyl, or propargyl; and

R₅ is hydrogen or methyl.

The compounds of the invention can exist in either or both the syn and anti geometric isomers.

The invention also includes pesticidal compositions comprising a pesticidally effective amount of a compound of formula I and a suitable diluent, and a method of controlling pests comprising applying to a locus to be protected a pest-controlling amount of a compound of formula I.

The invention further includes a class of novel 1-carbamoyl-N-hydroxyformimidates of the formula:

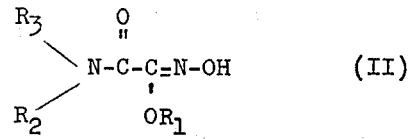

wherein R₁, R₂, and R₃ are as defined above for formula I. The compounds of formula II are intermediates for the compounds of formula I.

Finally, the invention includes a novel method of preparing the compounds of formula II which comprises reacting a 1-carbamoylformhydroxamyl chloride of the formula:

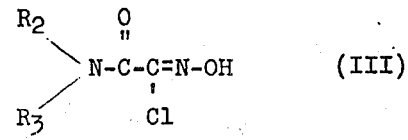

with two equivalents of base, at least the second equivalent of which is an alkoxide of the formula R₁OM (IV), wherein R₁, R₂, and R₃ are as defined above for formula I, and M is Na⁺, K⁺, Li⁺, or Cs⁺. The first equivalent of base can be, and preferably is, the same alkoxide used as the second equivalent of base. The reaction is carried out in an inert organic solvent at a temperature in the range from about −70°C. to +25°C.

DESCRIPTION OF THE INVENTION

PREPARATION

The compounds of formula I wherein both R₄ and R₅ are hydrogen are prepared by reacting an appropriate intermediate of formula II with sodium cyanate and hydrochloric acid at low temperature. The reaction is illustrated by equation (A):

(A) 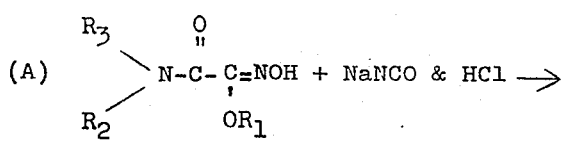

The compounds of formula I wherein only one of $R_4$ and $R_5$ is hydrogen are prepared by allowing an appropriate intermediate of formula II to react with a substituted isocyanate in an inert solvent such as acetone or acetonitrile. This reaction is illustrated by equation (B):

(B) 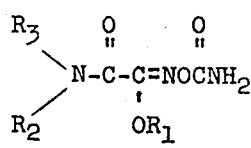

The compounds of formula I wherein neither $R_4$ nor $R_5$ is hydrogen are prepared by reacting an appropriate intermediate of formula II with sodium hydride in a solvent such as tetrahydrofuran and treating the resulting salt with a substituted carbamoyl chloride. This reaction is illustrated by equation (C):

(C) 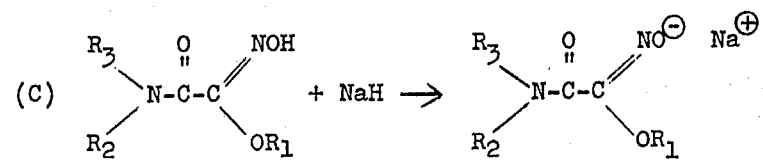

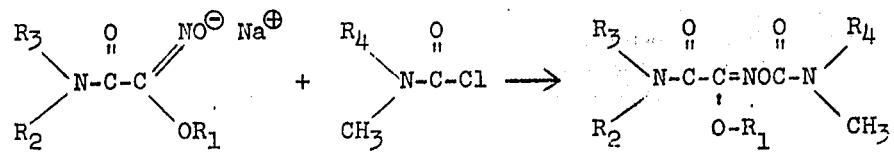

The intermediates of formula II are made by reacting a 1-carbamoylformhydroxamyl chloride of the formula:

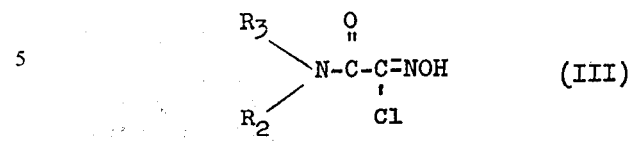

with two equivalents of base, at least the second of which is an alkoxide of the formula $R_1OM$ (IV), where M is $Na^+$, $K^+$, $Li^+$, or $Cs^+$. The first equivalent of base generates a 1-(carbamoyl) nitrile oxide of the formula:

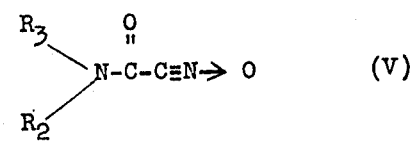

which will react with the equivalent of alkoxide to form the desired intermediate. The overall reaction is illustrated by equation (D):

(D) 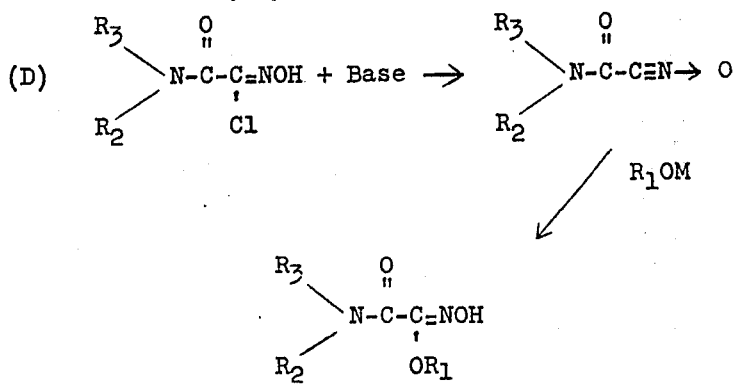

The first equivalent of base can be an inorganic base such as sodium hydroxide or an organic base such as triethylamine. Preferably, however, the first equivalent of base is the same alkoxide ($R_1OM$) which is used as the second equivalent. The reaction is conducted in an inert solvent which can be the alcohol corresponding to the alkoxide used (i.e., an alcohol of formula $R_1OH$) or another inert solvent such as benzene, tetrahydrofuran, dimethylformamide, dioxane, diethylether, or acetonitrile. The reaction can be conducted at a temperature in the range of about −70°C to −25°C. Lower temperatures, in the range of about −70°C to −10°C., are preferred. The reaction product is often isolated as the alkali metal salt, which can be washed with an organic solvent such as methylene chloride or ether. The oxime is subsequently freed from the cation by the cautious addition of a mineral acid such as hydrochloric acid to an aqueous solution of the salt.

FORMULATIONS

Compositions of this invention suitable for practical use as pesticides will include one or more compounds of formula (I) above either individually, in admixture with each other, or in admixture with other pesticides, and can include surface-active agents, solid or liquid diluents and other materials as desired to produce wettable powders, suspensions, emulsifiable concentrates, dusts, solutions, granules, pellets or high-strength compositions.

Surfactants can be used in amounts of up to 15 percent by weight based on the total weight of the resulting insecticidal composition.

Finely divided solid diluents can be used at a concentration of 2 to 98 percent by weight based on the total weight of the resulting pesticidal composition. More specifically, the solid diluents can be used in the preparation of water extendable concentrates containing from 75 to 98 percent of a compound of this invention; dust-base concentrates of similar strength compounded for easy dilution with dusting diluents; wettable powders containing from 20 to 90 percent of a compound of this invention; and dusts, usually ranging in active ingredient control from 2 to 25 percent. Preferred finely divided solid formulations are high-strength compositions and powders containing 2 to 25 percent of synthetic silica and 75 to 98 percent active ingredients, with up to approximately 6 percent of one or more surfactants optionally replacing some silica.

Organic liquid diluents can be used for the preparation of solutions, suspensions and emulsifiable concentrates.

Preferred solutions are those containing 5 to 30 percent active ingredient and 70 to 95 percent solvent. Preferred solvents are dimethyl formamide and dimethylsulfoxide.

Suspension formulations comprise from 10 to 50 percent of a compound of this invention dispersed in a non-solvent carrier. Dispersants and suspending agents can be present. Water can be used as a carrier for suspension concentrates of water-insoluble compounds of the invention.

Granules or pellets can be made containing 15 to 30 weight per cent of active ingredient, but more frequently a concentration of 2 to 20 per cent is preferred for optimum distribution. Such granular compositions are most useful in a size range of 0.25 mm to 1.4 mm.

The most preferred formulation for granules or pellets is 2 to 20 weight per cent active ingredient, 0 to 5 weight per cent surfactant and 75 to 98 per cent inert mineral carrier.

Additional modifiers can be used to advantage in the compositions of this invention. Thus, although the compounds of formula (I) are quite stable under most conditions, the use of a desiccant, buffering agent or materials such as urea, which inactivate catalytic sites on diluent particles can prove desirable. Additives which will inhibit corrosion, reduce foam, reduce caking and increase flocculation can also be used. In addition, bactericides, fungicides, bacteriostats and fungistats and other insecticides, acaracides and nematocides are often desirably present in the compositions of this invention in amounts of 0.025 to 10 parts by weight for each 1 part by weight of compound of formula (I). Suitable biologically active compounds are well known to those skilled in the art.

APPLICATION

In applying the compounds of formula (I) for pest control, the compound is of course applied in an amount sufficient to exert the desired pesticidal action. The amounts required to give pest control action however are governed by such variables as temperature, time of the year, moisture, type of application, pest species to be controlled and the like. Thus it is not possible to state any one method or rate of application which would be generally satisfactory. It is possible however to describe generally some of the various methods and rates of application for certain areas of use and to which the compounds of formula (I) are best suited.

The compounds of formula (I) can be used to control plant-predacious insects and mites by distributing the chemical over those plant surfaces are infested or which are to be protected from subsequent infestation. Due to their low order of phytotoxicity the compounds of formula (I) can be applied without fear of damage to the plant when used as directed. Use rates for this type of application are in the range of 0.05 to 34 kilograms of active ingredient per hectare. Rates of 0.1 to 17 kilograms per hectare are preferred and rates of 0.2 to 8 kilograms per hectare are most preferred for reasons of convenience and economy. This type of application may need to be repeated at intervals of 3 to 20 days. Such applications can be made with any of a variety of widely available types of equipment ordinarily used for such applications.

Other effective methods of application include:

a. To the seed of agricultural, horticultural and ornamental crops to protect the seed during storage and shipping prior to planting as well as to protect the seed and seedlings from attack by insects and mites after planting. The preferred rates for application to seed are in the range of 0.06 gram to 3 kilograms of the active compound of this invention per 100 kilograms of seed. The most preferred rates are in the range of 0.6 to 600 grams per 100 kilograms of seed.

b. To soil in which plants are to be planted or are growing to protect seed and plants from attack by insects and mites. Such protection is against both soil insects attacking the roots and insects and mites attacking the above-ground parts of the plants. Preferred use rates are in the range of 0.1 to 60 kilograms of active ingredient per hectare treated. The most preferred rates are in the range of 0.3 to 20 kilograms per hectare.

c. To the walls and floors of structures such as warehouses, stores, recreation buildings, factories, homes, poultry houses and barns to control insects, ticks and mites which could damage contents as well as attack or annoy people or domestic animals. Applications to be repeated as needed.

d. To insects, ticks and mites that cause injury or annoyance, or carry disease to animals. The compounds of this invention can be applied to the animals to be protected by sprays, dusts or dips in such a way as to give a more or less uniform coating. Applications to be repeated as needed.

e. To land areas (including marsh or swamp) for the control of insects, ticks, or mites causing injury or annoyance or disseminating disease to humans or animals. Preferred use rates are in the range of 0.01 to 10 kilograms of active compound of this invention per hectare 1 to 5 times a year. The most preferred rates are in the range of 0.03 to 3 kilograms of active per hectare on the same schedule.

The compounds of formula (I) are also well suited to the control of plant-parasitic nematodes inhabiting soil in which the plants are planted or are to be planted. The physical characteristics of the compounds of formula (I) permit them to be placed readily at the site of nematode presence or activity without disturbing already established plants. The physical nature of the compounds of formula (I) permit their movement deep into undisturbed soil around plant roots, often the site of nematode attack. The safety margin for plants make practical such application as well as application to soil being prepared for planting and application directly to seeds and growing plants at rates well above those required to control the nematodes.

Use rates for application to soil in which plants are growing are generally the same as those for application to soil being prepared for planting. Such rates range from about 0.15 to 225 kilograms of active ingredient per hectare of surface actually treated. Rates of 0.25 to 55 kilograms per hectare are most preferred for these uses for reasons of convenience and economy.

Other methods of applying the compounds of formula (I) to prevent the destructive effects of plant-parasitic nematodes include: spraying above-ground parts such as stems, leaves or buds in which nematodes are already present or where later attack is possible; dipping or soaking reproductive parts such as seeds, cane pieces or bulbs (which are already infested or are to be planted in infested soil) in a water suspension, solution or emulsion of the active ingredient; or immersing the root system or the entire plant of nursery stock or transplants in a water system to disinfect them or provide protection against subsequent nematode invasion. The rates of active ingredient in the sprays or dips used as noted just above are 12 grams to 4.8 kilograms per 100 liters of water. Preferred rates are in the range of 30 grams to 1.2 kilograms per 100 liters.

The following are examples 1–3 from parent application Ser. No. 55,290. Parts and percentages referred to in the examples are by weight unless otherwise noted.

EXAMPLE 1

Methyl 1-(dimethylcarbamoyl)-N-(methylcarbamoyloxy)formimidate

PART A

To a solution of 20 parts of 1-(dimethylcarbamoyl)-formhydroxamyl chloride in 1000 parts of methanol at −70°C. to 80°C. is added dropwise over 15–25 minutes a solution of 14.4 parts of sodium methoxide in 250 parts of methanol. The methanolic solution is allowed to warm to room temperature and is evaporated under reduced pressure. The residue is taken up in water and the resulting aqueous solution is washed thoroughly with methylene chloride and filtered through a darco pad to remove impurities. The aqueous solution is neutralized with dilute hydrochloric acid and allowed to evaporate. The resulting solid is extracted with a boiling solution of ethyl acetate/acetonitrile which is then filtered through a darco pad. Evaporation of the organic solvent under reduced pressure furnishes the solid methyl 1-(dimethylcarbamoyl)-N-hydroxyformimidate which is recrystallized from ethyl acetate/acetonitrile in the form of long, white needles, m.p. 157.5°–159.5°.

PART B

To a suspension of 8.75 parts of methyl 1-(dimethylcarbamoyl)-N-hydroxyformimidate and 3 drops of triethylamine in 100 parts of acetone at room temperature is added 4 parts of methyl isocyanate. The reaction is allowed to stir overnight and is then evaporated under reduced pressure. The nearly pure product is recrystallized from ethyl acetate/hexane to furnish the methyl 1(dimethylcarbamoyl)-N-(methylcarbamoyloxy)formimidate as a white solid, m.p. 79°–79.5°C.

The compounds of the fourth column of Table I are prepared according to the procedures of Example 1 using the alkoxides of the alcohols listed in the first column, the 1-(carbamoyl)formhydroxamyl chlorides listed in the second column, and the isocyanates listed in the third column. All of the alkoxides used are prepared from the alcohols listed and either potassium, sodium, lithium, or cesium.

TABLE I

| Alcohol | 1-Carbamoyl Formhydroxamyl Chloride | Isocyanate | Product |
| --- | --- | --- | --- |
| methyl alcohol | 1-(pyrrolidinocarbonyl) formhydroxamyl chloride | methyl isocyanate | methyl 1-(pyrrolidinocarbonyl)-N-(methylcarbamoyloxy)formimidate |
| ethyl alcohol | 1-(piperidinocarbonyl) formhydroxamyl chloride | allyl isocyanate | ethyl 1-(piperidinocarbonyl)-N-(allyl-carbamoyloxy)formimidate |
| ethyl alcohol | 1-(piperidinocarbonyl) formhydroxamyl chloride | butyl isocyanate | ethyl 1-(piperidinocarbonyl)-N-(butyl-carbamoyloxy)formimidate |
| butyl alcohol | 1-(piperidinocarbonyl) formhydroxamyl chloride | methyl isocyanate | butyl 1-(piperidinocarbonyl)-N-(methyl-carbamoyloxy)formimidate |
| butyl alcohol | 1-(piperidinocarbonyl) formhydroxamyl chloride | butyl isocyanate | butyl 1-(piperidinocarbonyl)-N-(butyl)-carbamoyloxy)formimidate |

EXAMPLE 2

Ethyl 1-(dimethylcarbamoyl)-N-(carbamoyloxy)formimidate

PART A

Replacing the sodium methoxide and methanol in Example 1, part A, with 18 parts of sodium ethoxide and ethanol as the solvent one similarly obtains ethyl 1-(dimethylcarbamoyl)-N-hydroxyformimidate.

PART B

To a solution of 7.2 parts of ethyl 1-(dimethylcarbamoyl)-N-hydroxyformimidate in 100 parts of water at 0°–10°C. is added slowly and simultaneously over several hours 3.25 parts sodium cyanate and 5 parts of concentrated hydrochloric acid. The product is extracted with methylene chloride, dried, and evaporated under reduced pressure to furnish ethyl 1-(dimethylcarbamoyl)-N-(carbamoyloxy)formimidate.

By substituting methyl 1-(piperidinocarbonyl)-N-hydroxyformimidate as the starting material in Part B of Example 2, methyl 1-(piperidinocarbonyl)-N-(carbamoyloxy)formimidate can be prepared.

EXAMPLE 3

Methyl 1-(carbamoyl-N-(dimethylcarbamoyloxy)-formimidate

PART A

Replacing the 1-(dimethylcarbamoyl)formhydroxyamyl chloride of Example 1, Part A, with 8.1 parts of 1-(carbamoyl)-formhydroxyamyl chloride one similarly obtains methyl 1-(carbamoyl)-N-hydroxyformimidate.

PART B

To a suspension of 10.6 parts of methyl 1-(carbamoyl)-N-hydroxyformimidate in 100 ml. of dioxane is added slowly 2.4 parts of sodium hydride. Rapid evolution of hydrogen is noted as a dense gray precipitate forms. The suspension is then refluxed for 1 hour followed by the dropwise addition of 10.2 g. of dimethylcarbamyl chloride. When the exothermic addition is complete the reaction is stirred at reflux for 1 hour. After cooling, the precipitate is filtered and washed with ether. The ether washings are combined with the filtrate and are evaporated under reduced pressure to afford the methyl 1-(carbamoyl)-N-(dimethylcarbamoyloxy)formimidate.

Methyl 1-(piperidinocarbonyl)-N-(dimethylcarbamoyloxy)formimidate can be prepared by substituting methyl 1-(piperidinocarbonyl)-N-hydroxyformimidate as starting material in Part B of Example 3.

I claim:

1. A compound of the formula

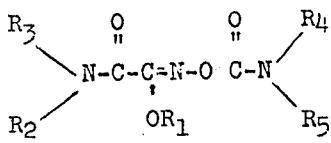

where:
- $R_1$ is glycidyl; alkyl of 1 through 4 carbon atoms; alkenyl of 3 through 4 carbon atoms; alkynyl of 3 through 4 carbon atoms; cycloalkyl of 3 through 6 carbon atoms; or alkyl of 1 through 4 carbon atoms substituted with 1 through 3 halogen atoms or with a methoxy, ethoxy, nitro, cyano, hydroxy, methylthio, carboxy, carbomethoxy, carboethoxy, amino, methylamino, ethylamino, dimethylamino, methylethylamino, methylpropylamino, or diethylamino group;
- $R_2$ and $R_3$ are taken together and are alkylene of 4 through 6 carbon atoms;
- $R_4$ is hydrogen, alkyl of 1 through 3 carbon atoms, allyl, or propargyl; and
- $R_5$ is hydrogen or methyl.

2. A compound of the formula

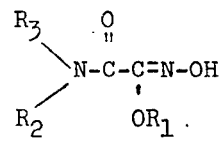

wherein:
- $R_1$ is glycidyl; alkyl of 1 through 4 carbon atoms; alkenyl of 3 through 4 carbon atoms; alkynyl of 3 through 4 carbon atoms; cycloalkyl of 3 through 6 carbon atoms; or alkyl of 1 through 4 carbon atoms substituted with 1 through 3 halogen atoms or with a methoxy, ethoxy, nitro, cyano, hydroxy, methylthio, carboxy, carbomethoxy, carboethoxy, amino, methylamino, ethylamino, dimethylamino, methylethylamino, methylpropylamino, or diethylamino group; and
- $R_2$ and $R_3$ are taken together and are alkylene of 4 through 6 carbon atoms.

3. A method of making a compound of the formula:

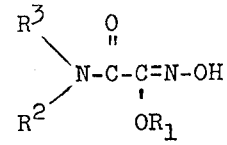

which comprises reacting a compound of the formula:

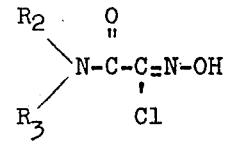

with two equivalents of base, at least the second of which is an alkoxide of the formula: $R_1OM$, wherein M is $Na^+$, $Li^+$, $K^+$ or $Cs^+$;
- $R_1$ is glycidyl; alkyl of 1 through 4 carbon atoms; alkenyl of 3 through 4 carbon atoms; alkynyl of 3 through 4 carbon atoms; cycloalkyl of 3 through 6 carbon atoms; or alkyl of 1 through 4 carbon atoms substituted with 1 through 3 halogen atoms or with a methoxy, ethoxy, nitro, cyano, hydroxy, methylthio, carboxy, carbomethoxy, carboethoxy, amino, methylamino, ethylamino, dimethylamino, methylethylamino, methylpropylamino, or diethylamino group; and
- $R_2$ and $R_3$ are taken together and are alkylene of 4 through 6 carbon atoms.

* * * * *